US012664110B2

(12) United States Patent
Kuo et al.

(10) Patent No.: US 12,664,110 B2
(45) Date of Patent: Jun. 23, 2026

(54) INPUT/OUTPUT DEVICE IN A HIGH DENSITY OR RACKMOUNT ENVIRONMENT

(71) Applicant: Hewlett Packard Enterprise Development LP, Spring, TX (US)

(72) Inventors: Chun-Hung Kuo, Zhubei City (TW); Han-Chung Yu, Taipei City (TW); Kun-Han Chen, Taipei City (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 67 days.

(21) Appl. No.: 18/412,908

(22) Filed: Jan. 15, 2024

(65) Prior Publication Data

US 2025/0231894 A1     Jul. 17, 2025

(51) Int. Cl.
*G06F 13/20*     (2006.01)
*G06F 1/20*     (2006.01)
*G06F 13/12*     (2006.01)
*G06F 13/40*     (2006.01)
*G06F 13/42*     (2006.01)

(52) U.S. Cl.
CPC ............. *G06F 13/20* (2013.01); *G06F 1/206* (2013.01)

(58) Field of Classification Search
CPC ................................. G06F 13/20; G06F 1/206
USPC ................ 710/2, 8, 15, 20, 33, 62, 104, 313
See application file for complete search history.

(56) References Cited

U.S. PATENT DOCUMENTS

| | | | |
|---|---|---|---|
| 2016/0037686 A1* | 2/2016 | Shabbir | G06F 1/206 700/300 |
| 2016/0072642 A1* | 3/2016 | Shih | H04L 41/04 370/392 |
| 2017/0116103 A1* | 4/2017 | Cencini | H04L 41/24 |
| 2019/0245915 A1* | 8/2019 | Kommula | H04L 43/0882 |
| 2020/0034207 A1* | 1/2020 | Selvaraj | G06F 9/5055 |
| 2020/0166977 A1* | 5/2020 | Jayaraman | G06F 1/206 |
| 2020/0241910 A1* | 7/2020 | Verma | G06F 9/5044 |
| 2021/0365301 A1* | 11/2021 | Rao | G06F 3/0605 |
| 2022/0055223 A1* | 2/2022 | Cheon | H04M 1/725 |
| 2023/0121936 A1* | 4/2023 | Hobbs | G06F 1/183 713/300 |
| 2023/0169019 A1* | 6/2023 | Cannata | G06F 13/102 710/105 |
| 2024/0311482 A1* | 9/2024 | Paulraj | G06F 21/85 |

* cited by examiner

*Primary Examiner* — Idriss N Alrobaye
*Assistant Examiner* — Henry W Yu
(74) *Attorney, Agent, or Firm* — Slater Matsil, LLP

(57) ABSTRACT

In certain embodiments, an input/output (IO) device includes: an IO interface configured to operatively connect the IO device to one or more computing devices; a device unit operatively connected to the IO interface and comprising a plurality of IO components; an IO internal expansion unit operatively connected to the IO interface and the device unit; a management unit configured to provide remote management capabilities for the IO device; a power unit operatively connected to and configured to provide power for the IO interface, the device unit, the IO internal expansion unit; and the management unit; and a thermal unit configured to provide thermal management for the IO device.

16 Claims, 6 Drawing Sheets

INPUT/OUTPUT DEVICE IN A HIGH DENSITY OR RACKMOUNT ENVIRONMENT

BACKGROUND

Computing devices (e.g., servers) are becoming more powerful, with more processors, more processing cores, more memory devices, etc. Such computing devices are often intended to be included in high-density environments, such as server racks. Computing devices are often implemented in certain form factors (e.g., 1U, 2U) to facilitate the high-density environments. As such, it is often difficult to continue to add additional components to computing devices, as considerations of space, power, and thermal management become increasingly challenging. Additionally, it is often challenging to manufacture computing devices that have a large variety of potential components included therein.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION OF ILLUSTRATIVE EMBODIMENTS

Figure 1:
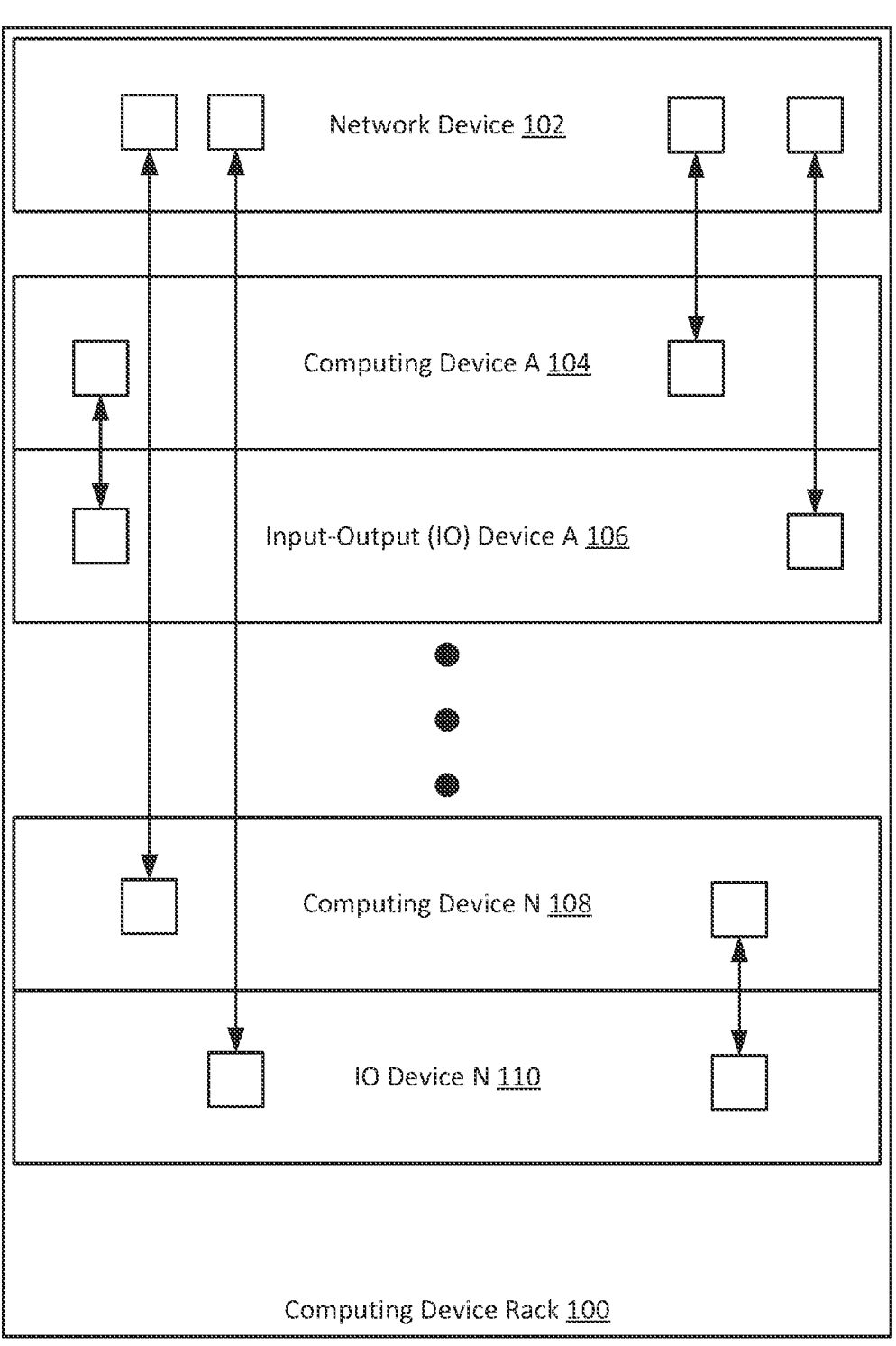
FIG. 1 illustrates a block diagram of an example system for implementing IO devices connected to computing devices in a computing device rack in accordance with one or more embodiments of this disclosure.

Computing devices (e.g., servers) are becoming more powerful, with increasingly more powerful processors and other components (e.g., power, cooling, memory, etc.) to support such processors and/or components. Additionally, users of such computing devices often desire to include in the computing devices myriad combinations of other components, such as network interfaces, storage interfaces, disk drives, accelerators (e.g., graphics processing units (GPUs)), compute express link (CXL) components (e.g., for memory expansion), and/or any other components that may be coupled to one or more system buses in the computing device and used to process, transfer, or otherwise operate on data.

However, many computing devices are packaged in form factors designed to allow for a high density of computing devices in a limited space. As an example, servers (e.g., one type of computing device) often come in certain size constraints (e.g., "1U", "2U", "short" chassis, "long" chassis, etc.) or combinations of size constraints to allow the servers to be mounted into racks, thereby allowing the servers to be packed more closely together, and possibly share mechanical support and other infrastructure (e.g., top-of-rack network devices).

It may be difficult to allow potential users of computing devices to have large numbers of variations of server configurations using large and varied sets of disparate components, while maintaining proper cooling, power, etc. for the components, processors, memory devices, etc. of the servers when constrained by the space allowed by the size constraints of servers intended for high density environments (e.g., rack mount servers, blade servers, etc.). It may also be difficult for a provider of servers to manufacture such a wide variety of device configurations for users in a reasonable amount of time, as each variation of components in a server may require a different plan of manufacture, reconfiguration of manufacturing resources, etc.

Embodiments disclosed herein attempt to address at least some of the aforementioned challenges of supporting a large number of possible server configurations in high-density environments by decoupling sets of components from the physical constraints of a given server. In one or more embodiments, some number of components, instead of being included in a server, are instead included in a separate input/output (IO) device (e.g., apparatus) that is coupled to one or more servers. In one or more embodiments, the IO device allows for the capabilities of servers to be expanded without reconfiguring the servers to include the additional components.

In one or more embodiments, the IO device is coupled to the server using one or more connections, which may employ a standard connection technology, such as the data-center-modular hardware system (DC-MHS) standard and/or the Peripheral Component Interconnect Express (PCI-E), and standard signal definitions, such as modular extensible I/O (M-XIO), modular platform infrastructure connectivity (M-PIC), etc.

In one or more embodiments, the IO device includes an IO interface for connecting to one or more servers (e.g., using DC-MHS). The IO device may also include a management unit, which may, for example, include a field programmable gate array (FPGA), microcontroller, baseboard management controller, etc. to allow for remote control of the IO device, such as health and status reporting, power capping, software and/or firmware updates, monitoring, etc. The management unit may, as an example, have an interface for connecting to a network device (e.g., a top-of-rack network device) to allow for remote management of the IO device, and the components therein, over a network.

In one or more embodiments, the IO device also includes an IO internal expansion unit. In one or more embodiments, an IO internal expansion unit is any set of one or more components for extending IO capabilities of the IO device. As an example, the IO internal expansion unit may include any number of peripheral component interconnect express (PCIe) switches, SAS/SATA expanders, server PCIe module (SXM) switches, etc.

In one or more embodiments, the IO device also includes a device unit. In one or more embodiments, a device unit is any set of one or more components for performing operations on data, transferring data, storing data, etc. Examples of such components include, but are not limited to, GPUs, Enterprise and Data Center Standard Form Factor (EDSFF) storage drives, CXL devices, network interface cards (NICs), SmartNICs, memory devices, any combination of such components, etc. In one or more embodiments, including such components in the IO device instead of the connected server allows for ease of manufacture of the server, the server to include less variations of components, the server to have access to expanded capabilities beyond what the server size, power, and thermal constraints allow, etc.

In one or more embodiments, the IO device includes a power unit. In one or more embodiments, a power unit is a component that provides power to the other components of the IO module. The power component may intake power from outside the IO device, and distribute the power within the IO device. The power component may include a redundant power configuration. In one or more embodiments, having a separate power component to provide power to the various components of the IO device allows the server to which the IO device is connected to use all of its power resources for other purposes, such as providing maximum power for processors, memory devices, etc.

In one or more embodiments, the IO device includes a thermal unit. In one or more embodiments, the thermal unit is a component for providing thermal management, temperature regulation, etc. for the IO device. As an example, the thermal unit may provide air cooling, liquid cooling, immersive cooling, etc. for various components (e.g., components of the device unit) of the IO device.

Examples of configurations of an IO device to be coupled to a server may include, but are not limited to: an IO device that includes four full-height, full-length double width GPUs to be used for GPU intensive workloads; an IO device that includes a large number of EDSFF drives for high performance storage scenarios; an IO device that includes a large number of GPUs, each with a dedicated NIC for use in receiving an processing data for artificial intelligence (AI) workloads, with liquid cooling to control the temperature of the components; an IO device with any number of CXL components to allow for expanded memory capacity to be available to a connected server; an IO device that includes any number of high performance network cards to improve network IO for a connected server; etc. In one or more embodiments, each of these example configurations, as well as other configurations of components in the IO device, allow for expanded capabilities to be provided to one or more servers without having to configure and manufacture the servers to include the additional components.

Certain embodiments of this disclosure may allow for capabilities of servers to be expanded without having to support large numbers of varied server configurations, or having to manufacture such configurations by moving components from inside the server to a connected IO device, while also improving thermal and power management for servers by including separate power components and thermal units in such IO devices.

FIG. 1 illustrates a block diagram of an example system for implementing IO devices connected to computing devices in a computing device rack in accordance with one or more embodiments of this disclosure. The system may include a computing device rack 100. The computing device rack may include a network device 102, any number of computing devices (e.g., computing device A 104, computing device N 108), and any number of IO devices (e.g., IO device A 106, IO device N 110). Each of these components is described below.

In one or more embodiments, the computing device rack 100 is a physical apparatus configured to hold and/or organize any number of devices. Such devices may include, but are not limited to, network devices (discussed below), computing devices (discussed below), IO devices (discussed below), storage devices, shelves (e.g., keyboard shelves), etc. In one or more embodiments, the computing device rack 100 allows for a number of devices to be included in a high-density environment, which may allow for better organization of the devices, better airflow for the devices, etc. The computing device rack 100 may include mounting components (e.g., rails) for mounting the devices within the rack and, optionally, to allow for the devices to be extended away from the rack at times (e.g., for performing maintenance on the devices). The computing device rack 100 may be open frame, allowing the devices inside to be visible, or may be closed, which may, for example, offer protection from accidental damage. The computing device rack 100 may include any number of spaces for devices. Such spaces may or may not be equivalently sized, and two or more spaces may be used to create a larger space. As an example, a computing device rack (e.g., the computing device rack 100) may be divided into any number of unit (U) spaces, and a given device installed in the rack may take up any number of U spaces (e.g., 1U, 2U, 4U, etc.). A deployment of computing resources may include a single computing device rack, or may include any number of computing device racks (e.g., thousands of such racks in a data center).

In one or more embodiments, the computing device rack 100 includes any number of network devices. In the example shown in FIG. 1, the computing device rack 100 includes the network device 102. The network device 102 may, for example, be a top-of-rack (TOR) network device, as it is located at the top of the computing device rack 100. A network device may be located in any location within the computing device rack 100 without departing from the scope of embodiments disclose herein.

In one or more embodiments, the network device 102 is a device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port, and which may provide connections (i.e., links) to other devices (e.g., computing devices, other network devices, etc.).

In one or more embodiments, the network device 102 also includes any number of additional components (not shown), such as, for example, network chips, field programmable gate arrays (FPGAs), application specific integrated circuits (ASICs), indicator lights (not shown), fans (not shown), power supply units, power distribution units (not shown), etc. At least a portion of such hardware components may be included as part of one or more line cards of the network device 102. In one or more embodiments, a line card, as used herein, refers to a collection of hardware components (e.g., connected by a printed circuit board) that include one or more physical interfaces (e.g., network ports) and any number of additional hardware components (e.g., ASICs, FPGAs, TCAMs, processor components, other memory components, etc.) that are used, at least in part, to store forwarding information and process network traffic. Forwarding information (which may include all or any portion of information that may be referred to as the 'FIB') may, for example, be stored (e.g., in various tables) in one or more hardware components of the line cards, such as MAC tables, route table entries, multicast forwarding entries, etc. The network device 102 may include any number of line cards, and each line card may include any number of physical interfaces. The network device 102 may include any other components without departing from the scope of embodiments described herein.

In one or more embodiments, as discussed above, the network device 102 includes at least one physical interface (and often two or more such physical interfaces). In one or more embodiments, physical interfaces are any hardware, software, or combination thereof that include functionality to receive and/or transmit network traffic data units (e.g., packets, frames, etc.) or any other information to or from the network device 102. Physical interfaces may include any interface technology, such as, for example, optical, electrical, etc. Physical interfaces may be configured to interface with any transmission medium (e.g., optical fiber, copper wire(s), etc.).

In one or more embodiments, physical interfaces include and/or are operatively connected to any number of components used in the processing of network traffic. For example, a given physical interface may include a PHY (not shown), which is circuitry that connects a physical information propagation medium (e.g., a wire) to other components (e.g., the hardware components of a line card), which process the network traffic. In one or more embodiments, physical interfaces include and/or are operatively connected to a transceiver, which provides the connection between the physical information transmission medium and the PHY. A PHY may also include any number of other components, such as, for example a serializer/deserializer (SERDES), and encoder/decoder, etc. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic being received, transmitted, or otherwise used by the network device 102 for any purpose (e.g., network device management, management of connected IO devices (discussed below), etc.).

In one or more embodiments, the network device 102 includes any software (e.g., various daemons, a state database, etc.) configured to perform various functions of the network device (e.g., to process network traffic). Such software may, for example, execute using one or more processors of a network device, and/or any other hardware resource of a network device capable of executing software.

Examples of a network device, such as the network device 102, include, but are not limited to, a switch, a router, a multilayer switch, an InfiniBand® device, etc. A network device is not limited to the aforementioned specific examples.

In one or more embodiments, the network device 102 includes functionality to receive network traffic (e.g., frames, packets, tunneling protocol frames, etc.) at any of the physical interfaces (i.e., ports) of the network device 102, and to process the network traffic. In one or more embodiments, processing a network traffic includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic processing include, but are not limited to, determining: (i) whether to take a security action (e.g., drop the network traffic data unit); (ii) whether to mirror the network traffic data unit; and/or (iii) how to route/forward the network traffic data unit in order to transmit the network traffic data unit from an interface of the network device 102.

In one or more embodiments, the network device 102 is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices, computing devices, etc.) that facilitate network connectivity for one or more operatively connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory (not shown) of the network device 102 may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, any number of computing devices (e.g., the computing device A 104, the computing device N 108) may be installed in the computing device rack 100. In one or more embodiments, each of the computing devices (e.g., the computing device A 104, the computing device N 108) are operatively connected to one or more network devices (e.g., the network device 102) that are also installed in the computing device rack 100.

In one or more embodiments, a computing device (e.g., the computing device A 104, the computing device N 108) is any physical and/or logical device that manipulates, processes, stores, interacts with, and/or otherwise uses data of any type. In one or more embodiments, as used herein, a computing device may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), and/or any other type of computing device with at least some of the aforementioned requirements. In one or more embodiments, any or all of the aforementioned examples may be combined to create a system of such devices, or may be partitioned into separate logical devices, which may separately or collectively be referred to as a computing device. Other types of computing devices may be used without departing from the scope of embodiments described herein, such as, for example, the computing device shown in FIG. 5 and described below. The system may include any number and/or type of such computing devices in any arrangement and/or configuration without departing from the scope of embodiments disclosed herein. Although FIG. 1 shows the computing devices (104, 108) installed in the computing device rack 100, computing devices that are connected to IO devices (discussed below) may not necessarily be installed in a computing device rack, yet still be connected to one or more IO devices.

In one or more embodiments, the storage (not shown) and/or memory (not shown) of a computing device or system of computing devices may be and/or include one or more data repositories for storing any number of data structures storing any amount of data (e.g., information) of any type. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

A computing device (e.g., the computing device A 104, the computing device N 108), such as, for example, a server, may be packaged in form factors designed to allow for a high density of computing devices in a limited space. As an example, servers (e.g., one type of computing device) often come in certain size constraints (e.g., "1 U", "2U", "short" chassis, "long" chassis, etc.) or combinations of size constraints to allow the servers to be mounted into racks (e.g., the computing device rack 100), thereby allowing the servers to be packed more closely together, and possibly share mechanical support and other infrastructure (e.g., top-of-rack network devices (e.g., the network device 102)). It may be difficult to allow potential users of computing devices (e.g., the computing device A 104, the computing device N 108) to have large numbers of variations of server configurations using large and varied sets of disparate components, while maintaining proper cooling, power, etc. for the components, processors, memory devices, etc. of the servers when constrained by the space allowed by the size constraints of servers intended for high density environments (e.g., rack mount servers, blade servers, etc.). It may also be difficult for a provider of servers to manufacture such a wide variety of device configurations for users in a reasonable amount of time, as each variation of components in a server may require a different plan of manufacture.

In one or more embodiments, a computing device (e.g., the computing device A 104, the computing device N 108) may include any number of interfaces for connecting to IO devices (discussed below), which may employ a standard connection technology, such as the datacenter-modular hardware system (DC-MHS), and standard signal definitions, such as modular extensible I/O (M-XIO), modular platform infrastructure connectivity (M-PIC), etc. In one or more embodiments, an M-XIO interface enables connections between computing device components (e.g., motherboards, host processor modules, storage controllers, network controllers, etc.), and other systems (e.g., IO devices (discussed below)). In one or more embodiments, interfaces conforming to DC-MHS may leverage PCIe, CXL, and/or other connection technologies to, for example, provide connectivity between computing devices (e.g., servers) and IO devices (discussed below). In one or more embodiments, IO devices may be connected to a computing device (e.g., the computing device A 104, the computing device N 108) using other interface technologies (e.g., PCIe without DC-MHS standard support) without departing from the scope of embodiments disclosed herein.

In one or more embodiments, any number of IO devices (e.g., the IO device 106, the IO device 110) may be installed in the computing device rack 100. In one or more embodiments, an IO device (e.g., the IO device 106, the IO device 110) may be connected to any one or more computing devices (e.g., the computing device A 104, the computing device N 108), which may or may not be installed in the same computing device rack (e.g., the computing device rack 100). In one or more embodiments, an IO device (e.g., the IO device 106, the IO device 110 includes one or more interfaces corresponding to interfaces on one or more computing devices for providing connectivity between the computing device and the IO device. An IO device (e.g., the IO device 106, the IO device 110 may include any number of other components without departing from the scope of embodiments disclosed herein, including, but not limited to, IO internal expansion units, management units, power units, device units, thermal units, etc. IO devices (e.g., the IO device 106, the IO device 110), and components therein, are discussed further in the description of FIG. 2, below.

While FIG. 1 shows a particular configuration of components, other configurations may be used without departing from the scope of embodiments described herein. For example, although FIG. 1 shows the computing devices connected to a single IO device, an IO device may be connected to any number of computing devices, and/or computing device may be connected to any number of IO devices. As another example, IO devices and/or computing devices may be connected to any number of network devices, which may or may not be the same network devices. As another example, connected computing devices and IO devices may be located in different computing device racks. As another example, an IO device, a connected computing device, or both, may not be located in a computing device rack at all. Accordingly, embodiments disclosed herein should not be limited to the configuration of components shown in FIG. 1.

Figure 2:
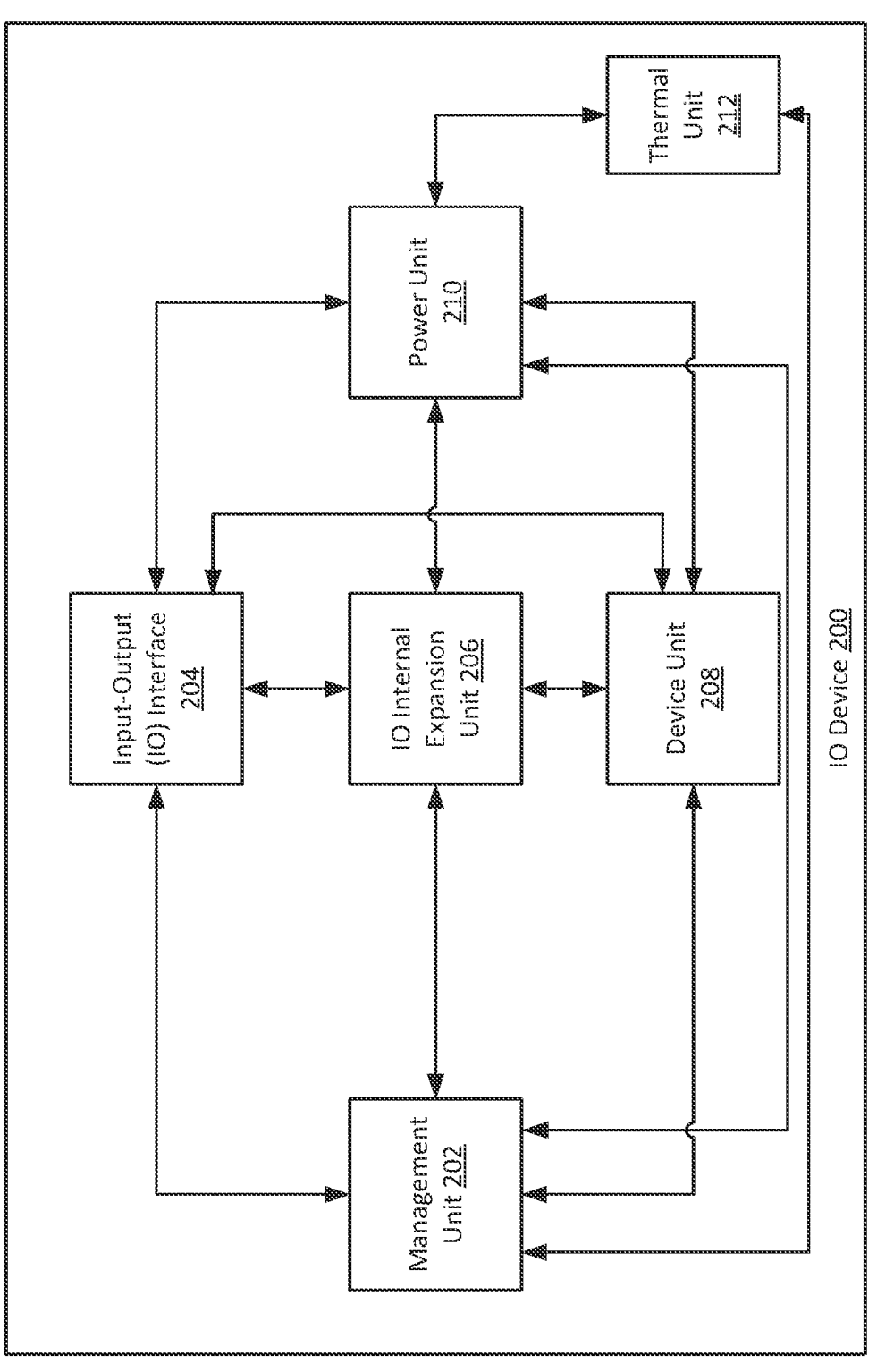
FIG. 2 illustrates a block diagram of an IO device in accordance with one or more embodiments disclosed herein.

FIG. 2 illustrates a block diagram of an IO device in accordance with one or more embodiments disclosed herein. As shown in FIG. 2, an IO device 200 includes a management unit 202, an IO interface unit 204, an IO internal expansion unit 206, a device unit 208, a power unit 210, and a thermal unit 212. Each of these components is described below.

In one or more embodiments, the IO device 200 include the IO interface unit 204. In one or more embodiments, the IO interface unit 204 is any one or more physical interfaces and other components for connecting the IO device 200 to one or more other devices (e.g., one or more computing devices). In one or more embodiments, the IO device 200 is coupled to one or more computing devices using one or more connections of the IO interface unit 204, which may employ a standard connection technology, such as DC-MHS, PCIe, and standard signal definitions, such as M-XIO, M-PIC, etc. The IO interface unit 204 may also include one or more interfaces for connecting the IO device 200 to one or more network devices (e.g., via ethernet, optical fiber, etc.). The IO interface unit 204 may be operatively connected to all or any portion of the management unit 202, the IO internal expansion unit 206, the device unit 208, and/or the power unit 210.

In one or more embodiments, the IO device 200 includes a management unit 202. The management unit 202 may be and/or include a FPGA, a microcontroller, baseboard management controller, etc. to allow for remote management of the IO device 200. Remote management may include, but is not limited to, features such as health and status reporting, power capping, software and/or firmware updates, monitoring, configuration, etc. Remote management may include managing all or any portion of the components of the IO device 200. The management unit 202 may, as an example, have an interface for connecting to a network device (e.g., the top-of-rack network device 102 of FIG. 1) via the IO interface unit 204 to allow for remote management of the IO device over a network. Additionally, or alternatively, the management unit 202 may include a separate one or more interfaces for connecting to a network device to allow remote management of the IO device 200. The management unit 202 may be operatively connected to all or any portion of the IO interface unit 204, the IO internal expansion unit 206, the device unit 208, the power unit 210, and/or the thermal unit 212.

In one or more embodiments, the IO device 200 includes the IO internal expansion unit 206. In one or more embodiments, the IO internal expansion unit 206 is any set of one or more components for extending IO capabilities of the IO device 200. As an example, the IO internal expansion unit 206 may include any number of peripheral component interconnect express (PCIe) switches, SAS/SATA expanders, server PCIe module (SXM) switches, etc. The IO expansion unit may be operatively connected to all or any portion of the management unit 202, the IO interface unit 204, the device unit 208, the power unit 210, and/or the thermal unit 212.

In one or more embodiments, the IO device 200 also includes the device unit 208. In one or more embodiments, the device unit 208 is any set of one or more components for performing operations on data, transferring data, storing data, etc. Examples of such components include, but are not limited to, GPUs, Enterprise and Data Center Standard Form Factor (EDSFF) storage drives, CXL devices, network interface cards (NICs), SmartNICs, memory devices, any combination of such components, etc. In one or more embodiments, including such components in the IO device 200 instead of a connected server allows for ease of manufacture of the server, the server to include less variations of components, the server to have access to expanded capabilities beyond what the server size, power, and thermal constraints allow, etc. The device unit 208 may be operatively connected to all or any portion of the management unit 202, the IO interface unit 204, the IO internal expansion unit 206, the power unit 210, and/or the thermal unit 212.

In one or more embodiments, the IO device 200 includes the power unit 210. In one or more embodiments, the power unit 210 is a component that provides power to the other components of the IO device 200. The power unit 210 may intake power from outside the IO device 200, and distribute the power within the IO device 200. The power unit 210 may include a redundant power configuration. The power unit 210 may be configured to store some amount of power, for example, to provide power to components of the IO device 200 for a period of time if external power is not available. The power unit 210 may be operatively connected to all or any portion of the management unit 202, the IO interface unit 204, the IO internal expansion unit 206, the device unit 208, and/or the thermal unit 212. In one or more embodiments, having a separate power unit 210 to provide power to the various components of the IO device 200 allows one or more computing devices to which the IO device 200 is connected to use all of their respective power resources for other purposes, such as providing maximum power for processors, memory devices, etc., instead of having to use some portion of the limited power of the computing devices to provide power to the components that are included in the IO device 200.

In one or more embodiments, the IO device 200 includes the thermal unit 212. In one or more embodiments, the thermal unit 212 is a component for providing thermal management, temperature regulation, etc. for the IO device 200. As an example, the thermal unit may provide air cooling, liquid cooling, immersive cooling, etc. for various components (e.g., components of the device unit) of the IO device. In one or more embodiments, having a separate thermal unit 212 included in the IO device 200 allows one or more computing devices to which the IO device 200 is connected to use all of their respective thermal management components for other purposes, such as providing thermal management (e.g., cooling) for processors, memory devices, etc. without having to also provide thermal management for components that are included in the IO device 200.

While FIG. 2 shows a particular configuration of components, other configurations may be used without departing from the scope of embodiments described herein. For example, although FIG. 2 shows certain components as part of the same device, any of the components may be grouped in sets of one or more components which may exist and execute as part of any number of separate and operatively connected devices. As another example, a single component may be configured to perform all, or any portion of the functionality performed by the components shown in FIG. 2. Accordingly, embodiments disclosed herein should not be limited to the configuration of components shown in FIG. 2.

Figure 3:
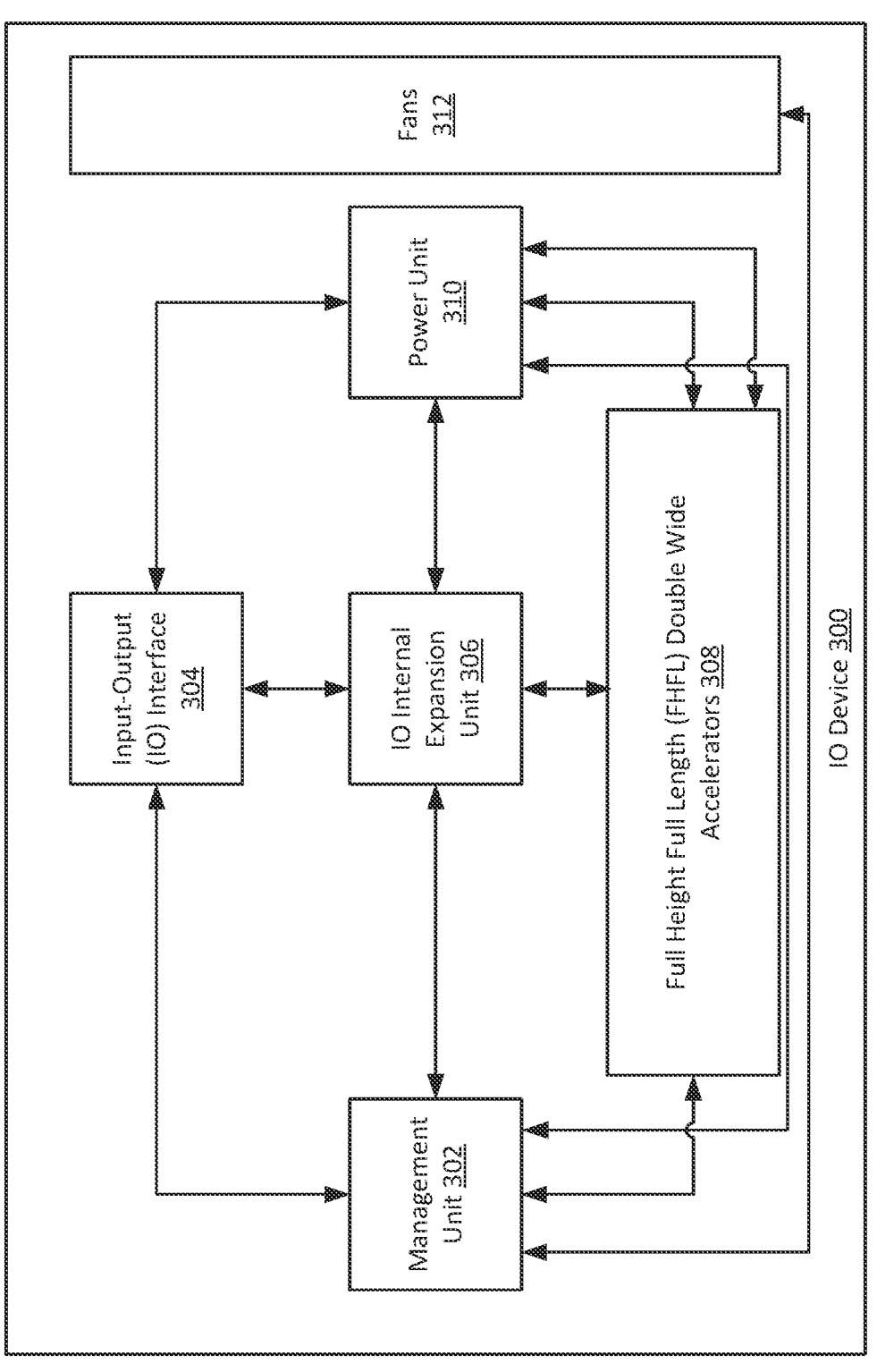
FIG. 3 illustrates an example IO device in accordance with one or more embodiments of this disclosure.

FIG. 3 illustrates an example IO device 300 in accordance with one or more embodiments of this disclosure. The example shown in FIG. 3 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. One of ordinary skill in the art will appreciate that any of the components of the example shown in FIG. 3 may be the same as, or combined with, similarly named and/or numbered components in any other figure, such as, for example, FIG. 1 and FIG. 2.

Consider a scenario in which a customer is seeking to purchase a number of servers. The customer is purchasing the servers to perform operations that require powerful GPUs (e.g., machine learning applications, AI applications, high performance computing, virtual reality applications, etc.). Thus, the customer may seek to purchase servers that are configured with a large number of powerful GPUs. However, such servers may be difficult to provide for a manufacturer of servers, for a variety of reasons. One such reason is that the customer may be planning to deploy the servers in a high-density rack environment, and, as such, seeks 1U servers so that many such servers may be installed per rack. However, such servers are space-limited, making it difficult to put as many GPUs as the customer wants into the servers. Additionally, such servers have a limited amount of power and thermal management capacity. Thus, adding a number of GPUs to the servers presents a challenge in that the power and thermal management capabilities of the servers may not be sufficient to provide the necessary power and cooling to the GPUs to allow the GPUs to be fully utilized, while still maintaining the necessary power and cooling required for the other components of the servers (e.g., processors, memory devices, etc.). Also, manufacturing such servers, having many additional GPUs may require a unique plan of manufacture that causes a reconfiguration of manufacturing resources that may not be applicable to solutions sought by other customers, leading to wasted resources.

In such a scenario, one solution is provided by embodiments disclosed herein, such as is shown in FIG. 3. FIG. 3 shows an example configuration of an IO device 300. As shown in FIG. 3, the IO device 300 includes a management unit 302 that allows remote management of the IO device 300 (as described above with regards to the management unit 202 shown in FIG. 2), an IO interface 304, which may, for example, provide connection to one or more server devices using connection technologies such as DC-MHS, M-XIO, M-PIC, etc., and an internal IO expansion unit 306 for extending IO capabilities of the IO device 300.

The IO device 300 also includes a number of full height full length (FHFL) double wide accelerators (e.g., GPUs) 308 as part of a device unit (e.g., the device unit 208 of FIG. 2) that may provide the processing capabilities sought by the customer. The IO device 300 also includes a power unit 310 configured to provide power for the FHFL double wide accelerators 308 separately from the power used by any one or more servers connected to the IO device 300. The IO device 300 also includes fans 312 that provide thermal management (e.g., cooling) for the components of the IO device 300 separately from any thermal management components of any one or more servers connected to the IO device 300.

The IO device 300 may be connected, as described above, to one or more servers, and may also be configured to be installed in a rack, just as the 1U servers desired by the customers are. Thus, the requirements of the customer may be met by having a separate IO device that includes the GPU capabilities needed, while allowing the manufacturer to more easily and predictably produce standard 1 U servers that may be coupled to the IO device 300. The connection technologies used between the servers and the IO device 300 allow for efficient data transfer and control of the GPUs, and the servers and the IO device 300 may be co-located in the same racks, allowing the customer to achieve the high-density computing environment sought.

Figure 4:
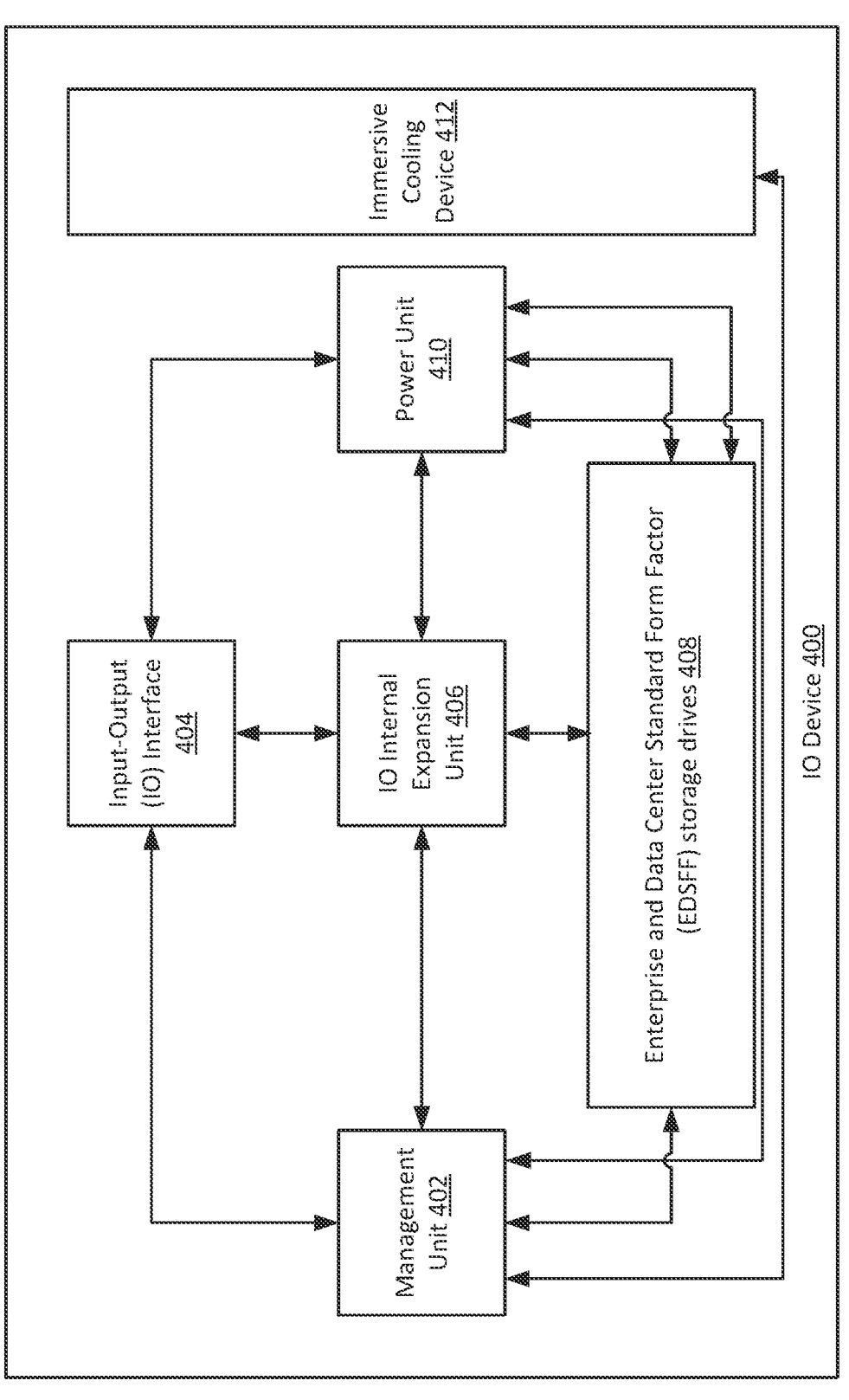
FIG. 4 illustrates an example IO device in accordance with one or more embodiments of this disclosure.

FIG. 4 illustrates an example IO device 400 in accordance with one or more embodiments of this disclosure. The example shown in FIG. 4 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. One of ordinary skill in the art will appreciate that any of the components of the example shown in FIG. 4 may be the same as, or combined with, similarly named and/or numbered components in any other figure, such as, for example, FIG. 1, FIG. 2, and/or FIG. 3.

Consider a scenario in which a customer is seeking to purchase a number of servers. The customer is purchasing the servers to perform operations that require high performance storage of data. Thus, the customer may seek to purchase servers that are configured with a large number of powerful EDSFF drives. However, such servers may be difficult to provide for a manufacturer of servers, for a variety of reasons. One such reason is that the customer may be planning to deploy the servers in a high-density rack environment, and, as such, seeks 1U servers so that many such servers may be installed per rack. However, such servers are space-limited, making it difficult to put as many EDSFF drives as the customer wants into the servers. Additionally, such servers have a limited amount of power and thermal management capacity. Thus, adding a number of EDSFF drives, which require additional power and cooling relative to standard SFF drives, to the servers presents a challenge in that the power and thermal management capabilities of the servers may not be sufficient to provide the necessary power and cooling to the EDSFF drives to allow the EDSFF drives to be fully utilized, while still maintaining the necessary power and cooling required for the other components of the servers (e.g., processors, memory devices, etc.). Also, manufacturing such servers, having many additional EDSFF drives may require a unique plan of manufacture that causes a reconfiguration of manufacturing resources that may not be applicable to solutions sought by other customers, leading to wasted resources.

In such a scenario, one solution is provided by embodiments disclosed herein, such as is shown in FIG. 4. FIG. 4 shows an example configuration of an IO device 400. As shown in FIG. 4, the IO device 400 includes a management unit 402 that allows remote management of the IO device 400 (as described above with regards to the management unit 202 shown in FIG. 2), an IO interface 404, which may, for example, provide connection to one or more server devices using connection technologies such as DC-MHS, M-XIO, M-PIC, etc., and an internal IO expansion unit 406 for extending IO capabilities of the IO device 400.

The IO device 400 also includes a number of EDSFF storage drives 408 as part of a device unit (e.g., the device unit 208 of FIG. 2) that may provide the storage capabilities sought by the customer. The IO device 400 also includes a power unit 410 configured to provide power for the EDSFF storage drives 408 separately from the power used by any one or more servers connected to the IO device 400. The IO device 400 also includes an immersive cooling device 412 that provides thermal management (e.g., cooling) for the components of the IO device 400 separately from any thermal management components of any one or more servers connected to the IO device 400.

The IO device 400 may be connected, as described above, to one or more servers, and may also be configured to be installed in a rack, just as the 1U servers desired by the customers are. Thus, the requirements of the customer may be met by having a separate IO device that includes the storage capabilities needed, while allowing the manufacturer to more easily and predictably produce standard 1 U servers that may be coupled to the IO device 400. The connection technologies used between the servers and the IO device 400 allow for efficient data transfer and control of the EDSFF storage drives, and the servers and the IO device 400 may be co-located in the same racks, allowing the customer to achieve the high-density computing environment sought.

Figure 5:
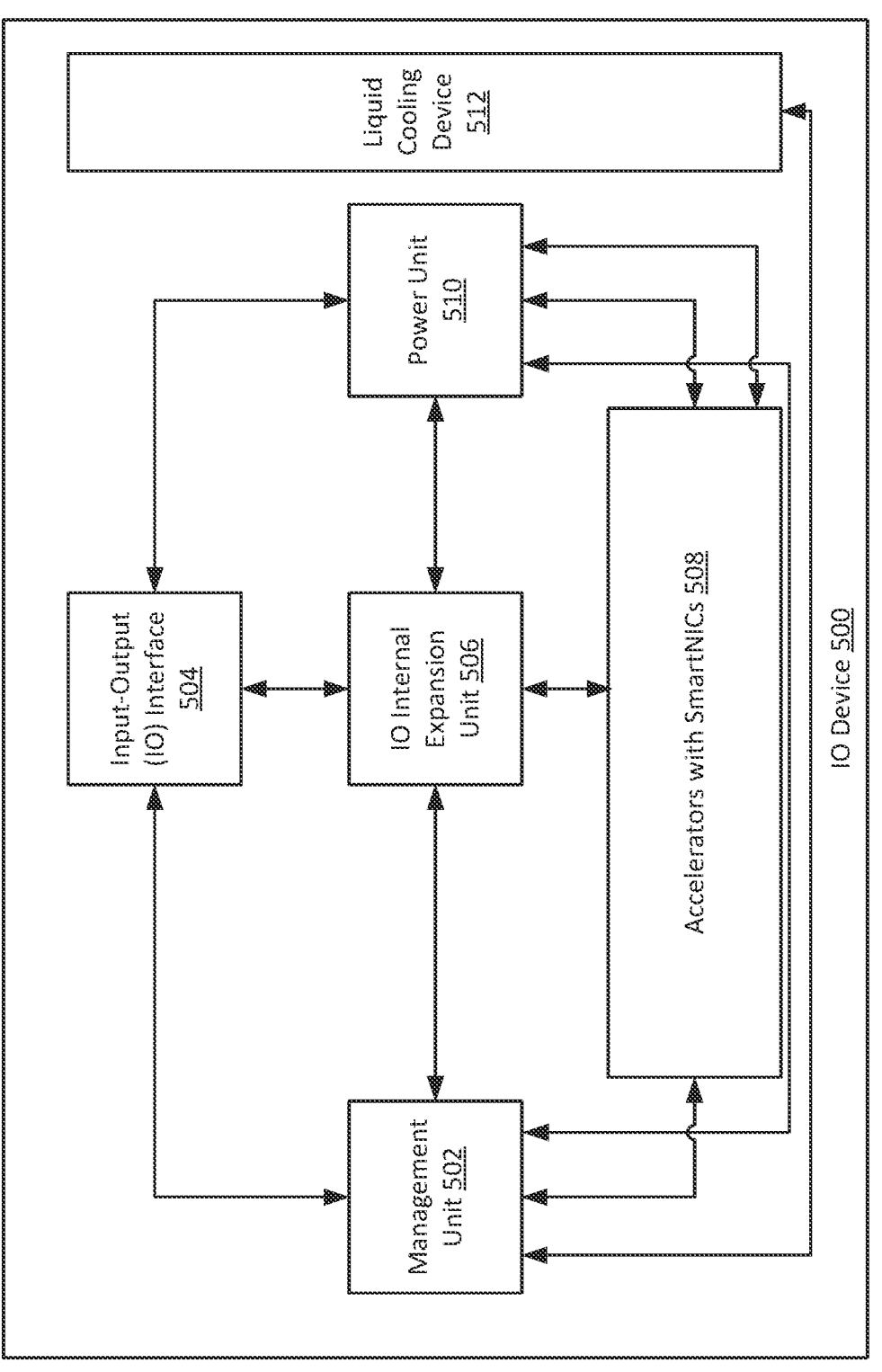
FIG. 5 illustrates an example IO device in accordance with one or more embodiments of this disclosure.

FIG. 5 illustrates an example IO device 500 in accordance with one or more embodiments of this disclosure. The example shown in FIG. 5 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example. One of ordinary skill in the art will appreciate that any of the components of the example shown in FIG. 5 may be the same as, or combined with, similarly named and/or numbered components in any other figure, such as, for example, FIG. 1, FIG. 2, FIG. 3, and/or FIG. 4.

Consider a scenario in which a customer is seeking to purchase a number of servers. The customer is purchasing the servers to perform operations that require powerful GPUs (e.g., machine learning applications, AI applications, high performance computing, virtual reality applications, etc.), with the data being operated on by the GPUs to be provided externally over a network. Thus, the customer may seek to purchase servers that are configured with a large number of powerful GPUs, and to have each GPU have a dedicated SmartNIC for receiving data to be provided to the corresponding GPU. However, such servers may be difficult to provide for a manufacturer of servers, for a variety of reasons. One such reason is that the customer may be planning to deploy the servers in a high-density rack environment, and, as such, seeks 1U servers so that many such servers may be installed per rack. However, such servers are space-limited, making it difficult to put as many GPUs and corresponding SmartNICs as the customer wants into the servers. Additionally, such servers have a limited amount of power and thermal management capacity. Thus, adding a number of GPUs, along with corresponding SmartNICs, to the servers presents a challenge in that the power and thermal management capabilities of the servers may not be sufficient to provide the necessary power and cooling to the GPUs and SmartNICs to allow the GPUs and SmartNICs to be fully utilized, while still maintaining the necessary power and cooling required for the other components of the servers (e.g., processors, memory devices, etc.). Also, manufacturing such servers, having many additional GPUs and Smart-NICs may require a unique plan of manufacture that causes a reconfiguration of manufacturing resources that may not be applicable to solutions sought by other customers, leading to wasted resources.

In such a scenario, one solution is provided by embodiments disclosed herein, such as is shown in FIG. 5. FIG. 5 shows an example configuration of an IO device 500. As shown in FIG. 5, the IO device 500 includes a management unit 502 that allows remote management of the IO device 500 (as described above with regards to the management unit 202 shown in FIG. 2), an IO interface 504, which may, for example, provide connection to one or more server devices using connection technologies such as DC-MHS, M-XIO, M-PIC, etc., and an internal IO expansion unit 506 for extending IO capabilities of the IO device 500.

The IO device 500 also includes a number of full height full length (FHFL) double wide accelerators (e.g., GPUs)

508 as part of a device unit (e.g., the device unit 208 of FIG. 2) that may provide the processing capabilities sought by the customer. The IO device 500 also includes a power unit 510 configured to provide power for the FHFL double wide accelerators 508 separately from the power used by any one or more servers connected to the IO device 500. The IO device 500 also includes a liquid cooling device 512 that provides thermal management (e.g., cooling) for the components of the IO device 500 separately from any thermal management components of any one or more servers connected to the IO device 500.

The IO device 500 may be connected, as described above, to one or more servers, and may also be configured to be installed in a rack, just as the 1U servers desired by the customers are. Thus, the requirements of the customer may be met by having a separate IO device that includes the GPU with SmartNIC capabilities needed, while allowing the manufacturer to more easily and predictably produce standard 1 U servers that may be coupled to the IO device 500. The connection technologies used between the servers and the IO device 500 allow for efficient data transfer and control of the GPUs and SmartNICs, and the servers and the IO device 500 may be co-located in the same racks, allowing the customer to achieve the high-density computing environment sought.

Figure 6:
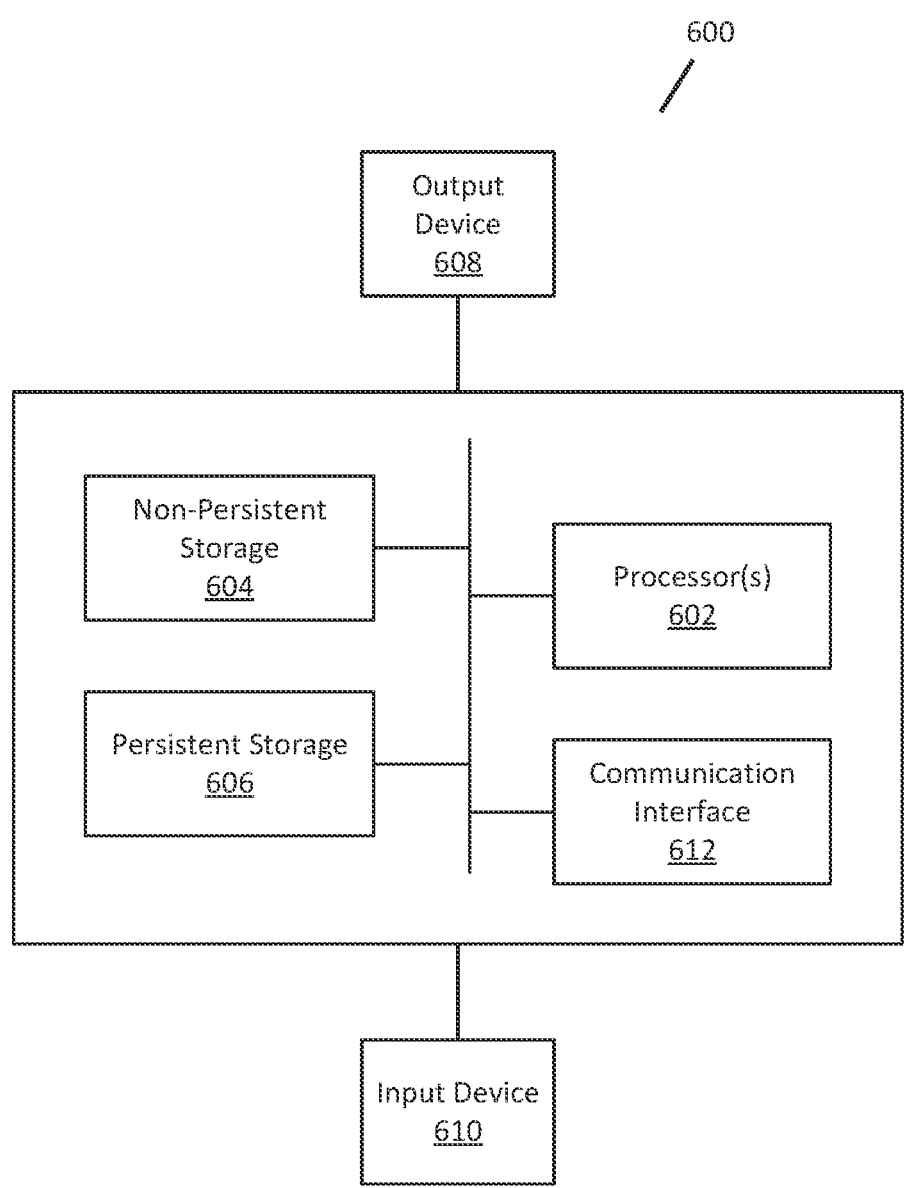
FIG. 6 illustrates a block diagram of a computing device, in accordance with one or more embodiments of this disclosure.

FIG. 6 illustrates a block diagram of a computing device, in accordance with one or more embodiments of this disclosure. As discussed above, embodiments described herein may be implemented, at least in part, using computing devices. For example, all or any portion of the components shown in FIG. 1 may be implemented, at least in part, using one or more computing devices. The computing device 600 may include one or more computer processors 602, non-persistent storage 604 (e.g., volatile memory, such as random access memory (RAM), cache memory, etc.), persistent storage 606 (e.g., a hard disk, an optical drive such as a compact disk (CD) drive or digital versatile disk (DVD) drive, a flash memory, etc.), a communication interface 612 (e.g., Bluetooth interface, infrared interface, network interface, optical interface, etc.), input devices 610, output devices 608, and numerous other elements (not shown) and functionalities. Each of these components is described below.

In one or more embodiments, the computer processor(s) 602 may be an integrated circuit for processing instructions. For example, the computer processor(s) may be one or more cores or micro-cores of a processor. The processor 602 may be a general-purpose processor configured to execute program code included in software executing on the computing device 600. The processor 602 may be a special purpose processor where certain instructions are incorporated into the processor design. Although only one processor 602 is shown in FIG. 5, the computing device 600 may include any number of processors without departing from the scope of embodiments disclosed herein.

The computing device 600 may also include one or more input devices 610, such as a touchscreen, keyboard, mouse, microphone, touchpad, electronic pen, motion sensor, or any other type of input device. The input devices 610 may allow a user to interact with the computing device 600. In one or more embodiments, the computing device 600 may include one or more output devices 608, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 602, non-persistent storage 604, and persistent storage 606. Many different types of computing devices exist, and the aforementioned input and output device(s) may take other forms. In some instances, multi-modal systems can allow a user to provide multiple types of input/output to communicate with the computing device 600.

Further, the communication interface 612 may facilitate connecting the computing device 600 to a network (not shown) (e.g., a local area network (LAN), a wide area network (WAN) such as the Internet, mobile network, or any other type of network) and/or to another device, such as another computing device. The communication interface 612 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 612 may also include one or more Global Navigation Satellite System (GNSS) receivers or transceivers that are used to determine a location of the computing device 600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory, or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 600 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. An input/output (IO) device, comprising:
an IO interface configured to operatively connect the IO device to one or more computing devices;
a device unit operatively connected to the IO interface and comprising a plurality of IO components configured to provide additional capabilities to the one or more computing devices, wherein:
the additional capabilities comprise performing operations, transferring data, or storing data based on instructions from of the one or more computing devices,
the plurality of IO components comprises a plurality of graphics processing units (GPUs) and a plurality of Smart Network Interface Cards (SmartNICs) co-located within the IO device,
each GPU of the plurality of GPUs corresponds to a respective dedicated SmartNIC of the plurality of SmartNICs, and
each respective dedicated SmartNIC of the plurality of SmartNICs is configured to receive data for, and provide data to, a respective GPU of the plurality of GPUs to which the respective dedicated SmartNIC corresponds to be processed by the respective GPU;
an IO internal expansion unit operatively connected to the IO interface and the device unit;
a management unit configured to provide remote management capabilities for managing the IO device;
a power unit operatively connected to and configured to provide power to the IO interface, the device unit, the IO internal expansion unit; and the management unit; and
a thermal unit configured to provide thermal management for the IO device, the thermal management comprising cooling of the IO device,
wherein the IO device is a single physical device comprising the IO interface, the device unit, the IO internal expansion unit, the management unit, and the thermal unit, and is separate from any of the one or more computing devices.

2. The IO device of claim 1, wherein the IO interface is configured to operatively connect the IO device to the one or more computing devices using datacenter-modular hardware system (DC-MHS) standards.

3. The IO device of claim 1, wherein the plurality of IO components further comprises a plurality of Enterprise and Data Center Standard Form Factor (EDSFF) storage drives.

4. The IO device of claim 1, wherein the thermal unit comprises one or more fans.

5. The IO device of claim 1, wherein the thermal unit comprises an immersive cooling device.

6. The IO device of claim 1, wherein the thermal unit comprises a liquid cooling device.

7. The IO device of claim 1, wherein the plurality of IO components further comprises a plurality of memory devices configured to communicate with the one or more computing devices using a compute express link (CXL) interconnect.

8. The IO device of claim 1, wherein the IO device is co-located in a computing device rack with at least one of the one or more computing devices.

9. A system, comprising:
a computing device; and
an input/output (IO) device, comprising:
an IO interface operatively connected to the computing device;
a device unit operatively connected to the IO interface and comprising a plurality of IO components configured to provide additional capabilities to the computing device,
wherein:
the additional capabilities comprise performing operations, transferring data, or storing data based on instructions from of the computing device, the plurality of IO components comprises a plurality of graphics processing units (GPUs) and a plurality of Smart Network Interface Cards (SmartNICs) co-located within the IO device, each GPU of the plurality of GPUs corresponds to a respective dedicated SmartNIC of the plurality of SmartNICs, and each respective dedicated SmartNIC of the plurality of SmartNICs is configured to receive data for, and provide data to, a respective GPU of the plurality of GPUs to which the respective dedicated SmartNIC corresponds to be processed by the respective GPU;

an IO internal expansion unit operatively connected to the IO interface and the device unit;

a management unit configured to provide remote management capabilities for managing the IO device;

a power unit operatively connected to and configured to provide power to the IO interface, the device unit, the IO internal expansion unit; and the management unit; and a thermal unit configured to provide thermal management for the IO device, the thermal management comprising cooling of the IO device, wherein the IO device is a single physical device comprising the IO interface, the device unit, the IO internal expansion unit, the management unit, and the thermal unit, and is separate from any of the one or more computing devices.

10. The IO device of claim 9, wherein the IO interface is configured to operatively connect the IO device to the computing device using datacenter-modular hardware system (DC-MHS) standards.

11. The IO device of claim 9, wherein the plurality of IO components further comprises a plurality of Enterprise and Data Center Standard Form Factor (EDSFF) storage drives.

12. The IO device of claim 9, wherein the thermal unit comprises one or more fans.

13. The IO device of claim 9, wherein the thermal unit comprises an immersive cooling device.

14. The IO device of claim 9, wherein the thermal unit comprises a liquid cooling device.

15. The IO device of claim 9, wherein the plurality of IO components further comprises a plurality of memory devices configured to communicate with the computing device using a compute express link (CXL) interconnect.

16. The system of claim 9, wherein the computing device and the IO device are co-located in a computing device rack.

\* \* \* \* \*